US006163008A

United States Patent [19]

Roberts et al.

[11] Patent Number: 6,163,008

[45] Date of Patent: Dec. 19, 2000

[54] PLASMA ARC TORCH

[75] Inventors: Jesse A. Roberts, Plainfield; Kevin D. Horner-Richardson, Cornish, both of N.H.; David A. Small, Stafford, Vt.; Gene V. Hewes, Plaintfield, N.H.

[73] Assignee: Thermal Dynamics Corporation, West Lebanon, N.H.

[21] Appl. No.: 09/457,944

[22] Filed: Dec. 9, 1999

[51] Int. Cl.[7] .................................................... B23K 10/00

[52] U.S. Cl. ............................... 219/121.48; 219/121.48; 219/75; 219/121.5; 219/121.52; 219/138

[58] Field of Search ........................... 219/121.5, 121.52, 219/121.51, 121.48, 121.39, 74, 75, 137.44, 138

[56] References Cited

U.S. PATENT DOCUMENTS

| | | | |
|---|---|---|---|
| 3,234,354 | 2/1966 | Penberg . | |
| 3,238,352 | 3/1966 | Kollmann et al. . | |
| 3,558,847 | 1/1971 | Width . | |
| 3,558,848 | 1/1971 | Width . | |
| 3,562,482 | 2/1971 | Friedberg et al. . | |
| 3,632,958 | 1/1972 | Width . | |
| 3,731,046 | 5/1973 | Brems . | |
| 4,567,346 | 1/1986 | Marhic . | |
| 4,623,775 | 11/1986 | Lange . | |
| 4,701,590 | 10/1987 | Hatch . | |
| 4,762,976 | 8/1988 | Miller et al. . | |
| 4,769,524 | 9/1988 | Hardwick . | |
| 4,777,342 | 10/1988 | Hafner . | |
| 4,833,294 | 5/1989 | Montaser et al. . | |
| 4,902,871 | 2/1990 | Sanders et al. . | |
| 4,940,877 | 7/1990 | Broberg . | |
| 5,101,088 | 3/1992 | Andersson et al. . | |
| 5,473,140 | 12/1995 | Colling . | |
| 5,624,586 | 4/1997 | Sobr et al. ......................... | 219/121.48 |
| 5,756,959 | 5/1998 | Freeman et al. . | |
| 5,841,095 | 11/1998 | Lu et al. . | |
| 5,856,647 | 1/1999 | Luo . | |
| 5,886,315 | 3/1999 | Lu et al. . | |
| 5,897,795 | 4/1999 | Lu et al. . | |
| 5,965,040 | 10/1999 | Luo et al. ............................ | 219/121.5 |

FOREIGN PATENT DOCUMENTS

| | | |
|---|---|---|
| XP002052526 | 9/1970 | Russian Federation . |

*Primary Examiner*—Mark Paschall
*Attorney, Agent, or Firm*—Senniger, Powers, Leavitt & Roedel

[57] ABSTRACT

A plasma arc torch has a cathode and electrode having connecting ends configured for a coaxial telescoping connection with one another on a central longitudinal axis of the torch. The connecting ends have interengageable detents thereon, with at least one of the detents being movable in a generally radial direction relative to the central longitudinal axis of the torch between an undeflected state and a deflected state. The at least one detent is movable from the undeflected state to the deflected state when the cathode and electrode are telescoped one into the other, and is movable from the deflected state back toward the undeflected state when the cathode and electrode are further telescoped tc, a point where the detents on the cathode and electrode are generally axially aligned. In this position, the at least one detent is engageable with the other detent to interconnect the cathode and electrode and inhibit axial movement of the electrode away from the cathode.

23 Claims, 9 Drawing Sheets

PLASMA ARC TORCH

BACKGROUND OF THE INVENTION

The present invention relates generally to plasma arc torches and, in particular, to connection designs for interconnecting an electrode in a plasma arc torch in electrical connection with the cathode of the torch.

Plasma torches, also known as electric arc torches, are commonly used for cutting and welding metal workpieces by directing a plasma consisting of ionized gas particles toward the workpiece. In a typical plasma torch, a gas to be ionized is supplied to a lower end of the torch and flows past an electrode before exiting through an orifice in the torch tip. The electrode, which is a consumable part, has a relatively negative potential and operates as a cathode. The torch tip (nozzle) surrounds the electrode at the lower end of the torch in spaced relationship with the electrode and constitutes a relatively positive potential anode. When a sufficiently high voltage is applied to the electrode, an arc is caused to jump the gap between the electrode and the torch tip, thereby heating the gas and causing it to ionize. The ionized gas in the gap is blown out of the torch and appears as a arc that extends externally off the tip. As the head or lower end of the torch is moved to a position close to the workpiece, the arc jumps or transfers from the torch tip to the workpiece because the impedance of the workpiece to ground is lower than the impedance of the torch tip to ground. During this "transferred arc" operation, the workpiece itself serves as the anode.

In a conventional plasma torch, an electrode having external threads engages an internally threaded bore in a cathode body to secure the electrode to the torch head. However, it is expensive to manufacture a threaded electrode and cathode. It is also often time consuming to perform a threading operation on consumable items such as electrodes, particularly because a separate tool, such as a wrench, must be used to install the electrode in or remove it from the cathode. In another torch design, the electrode is held in electrical contact with the cathode using a nozzle and shield cup. When the shield cup is tightened on the torch body, the electrode and nozzle are secured in fixed position on the torch, with the electrode held in electrical contact with the cathode. Assembly of this type of torch, such as when the consumable electrode or nozzle needs replacing, is often cumbersome because if the torch is not held upright during assembly the electrode will simply fall out of or may be easily jarred from the torch. This is particularly problematic when the torch operator performs the assembly at a location, such as up on a ladder or scaffolding, from which retrieval of a dropped electrode is inconvenient and can result in loss of the electrode.

There is a need, therefore, for a plasma torch having a threadless design for electrically connecting an electrode to a cathode in the torch to inhibit axial movement of the electrode outward from the torch during assembly of the torch.

SUMMARY OF THE INVENTION

Among the several objects and features of the present invention is the provision of a plasma torch having a threadless design for electrically connecting an electrode to the cathode of the torch; the provision of such a torch in which the electrode is interconnected with the torch to inhibit axial movement of the electrode outward from the torch during assembly or disassembly of the torch; the provision of such a torch in which the electrode is easy to replace; the provision of such a torch which includes a cathode and a consumable electrode of unique configurations; the provision of such a torch wherein the electrode and cathode can be readily connected and disconnected for ease of use; and the provision of such a torch wherein no tools are required for interconnecting the electrode to the torch.

Briefly, a plasma arc torch of the present invention generally comprises a cathode and electrode having connecting ends configured for a coaxial telescoping connection with one another on a central longitudinal axis of the torch. Interengageable detents are disposed on the connecting ends of the cathode and electrode. At least one of the detents is movable in a generally radial direction relative to the central longitudinal axis of the torch between an undeflected state and a deflected state. The at least one detent is movable from the undeflected state to the deflected state when the cathode and electrode are telescoped one into the other, and is movable from the deflected state back toward the undeflected state when the cathode and electrode are further telescoped to a point where the detents on the cathode and electrode are generally axially aligned. In this position, the at least one detent is engageable with the other detent to interconnect the cathode and electrode and inhibit axial movement of the electrode away from the cathode.

In another embodiment, the plasma torch generally comprises a cathode and electrode having connecting ends configured for coaxial telescoping movement relative to one another on a central longitudinal axis of the torch, the cathode and electrode being capable of electrical connection with one another in the torch. A detent is on the connecting end of the electrode and a corresponding detent in the plasma torch is arranged for interengagement with the detent on the electrode connecting end upon insertion of the electrode in the torch. The detent on the connecting end of the electrode is movable in a generally radial direction relative to the central longitudinal axis of the torch between an undeflected state and a deflected state. Such movement allows insertion of the electrode in the torch to a position in which the electrode is in electrical connection with the cathode and the detent on the electrode connecting end is interengageable with the detent in the plasma torch to inhibit axial movement of the electrode outward from the torch.

In general, a plasma torch cathode of the present invention has a connecting end adapted for electrical connection with an electrode in the torch and a detent extending radially from the connecting end for interconnecting the electrode and cathode in the torch. The detent is movable in a generally radial direction relative to a central longitudinal axis of the cathode between an undeflected state and a deflected state for allowing relative telescopic movement of the cathode and electrode to interconnect the cathode and the electrode. The detent inhibits axial movement of the electrode out of the torch upon interconnection of the cathode and electrode.

A plasma torch electrode of the present invention generally has a connecting end adapted for interconnection with the plasma torch. The connecting end is resiliently movable relative to a central longitudinal axis of the electrode between a normal, undeflected state and a deflected state in which the diameter of the connecting end of the electrode is substantially changed from its normal, undeflected state. The radial movement permits insertion in and interconnection with the torch.

In another embodiment, a plasma torch electrode generally has a connecting end and a detent on the connecting end extending generally radially therefrom for interconnection with a cathode of the plasma torch to inhibit axial movement of the electrode out of the torch.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
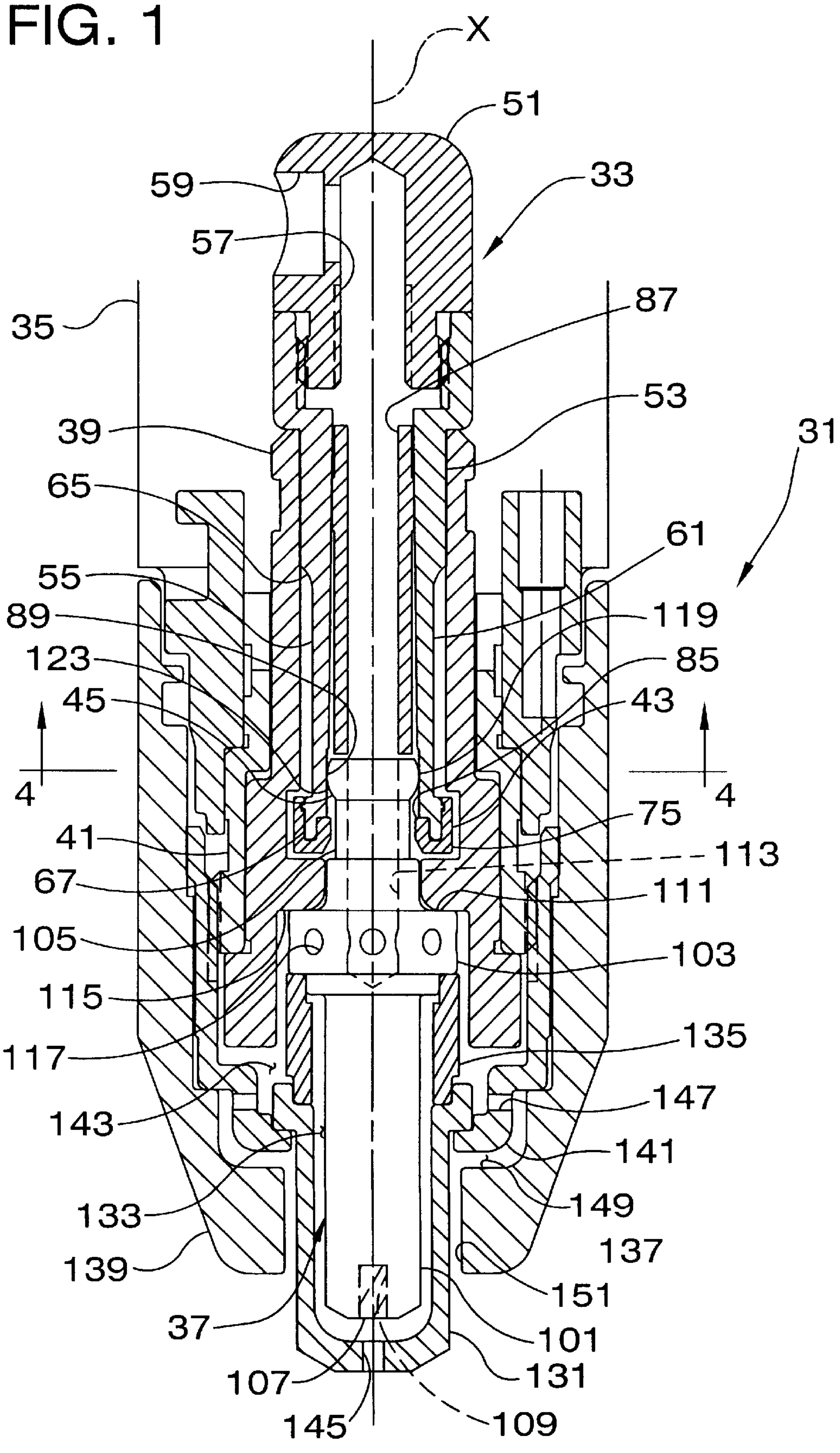
FIG. 1 is a vertical section of a torch head of a plasma torch of the present invention with an electrode shown in full.

With reference to the various drawings, and in particular to FIG. 1, a torch head of a plasma torch of the present invention is generally indicated at 31. The torch head 31 includes a cathode, generally indicated at 33, secured in a torch body 35 of the torch at an upper end of the torch head, and an electrode, generally indicated at 37, electrically connected to the cathode. A central insulator 39 constructed of a suitable electrically insulating material, such as a polyamide or polyimide material, surrounds a substantial portion of both the cathode 33 and the electrode 37 to electrically isolate the cathode and electrode from a generally tubular anode 41 that surrounds a portion of the insulator.

In accordance with the present invention, the cathode 33 and electrode 37 are configured for a coaxial telescoping connection with one another on a central longitudinal axis X of the torch. To establish this connection, the cathode 33 and electrode 37 are formed with opposing detents generally designated 43 and 45, respectively. As will be described hereinafter, these detents 43, 45 are interengageable with one another when the electrode 37 is connected to the cathode 33 to inhibit axial movement of the electrode away from the cathode.

The cathode 33, constructed in accordance with the present invention, is generally tubular and comprises a head 51, a body 53 and a lower connecting end 55 adapted for coaxial interconnection with the electrode 37 about the longitudinal axis X of the torch. A central bore 57 extends longitudinally substantially the length of the cathode 33 to direct a working gas through the cathode. An opening 59 in the cathode head 51 is in fluid communication with a source of working gas (not shown) to receive working gas into the torch head 31. The bottom of the cathode 33 is open to exhaust gas from the cathode. The cathode 33 of the illustrated embodiment is constructed of brass, with the head 51, body 53 and lower connecting end 55 of the cathode preferably being of unitary construction. However, it is understood that the head 51 may be formed separate from the body 53 and subsequently attached to or otherwise fitted on the cathode body without departing from the scope of this invention.

Figure 2:
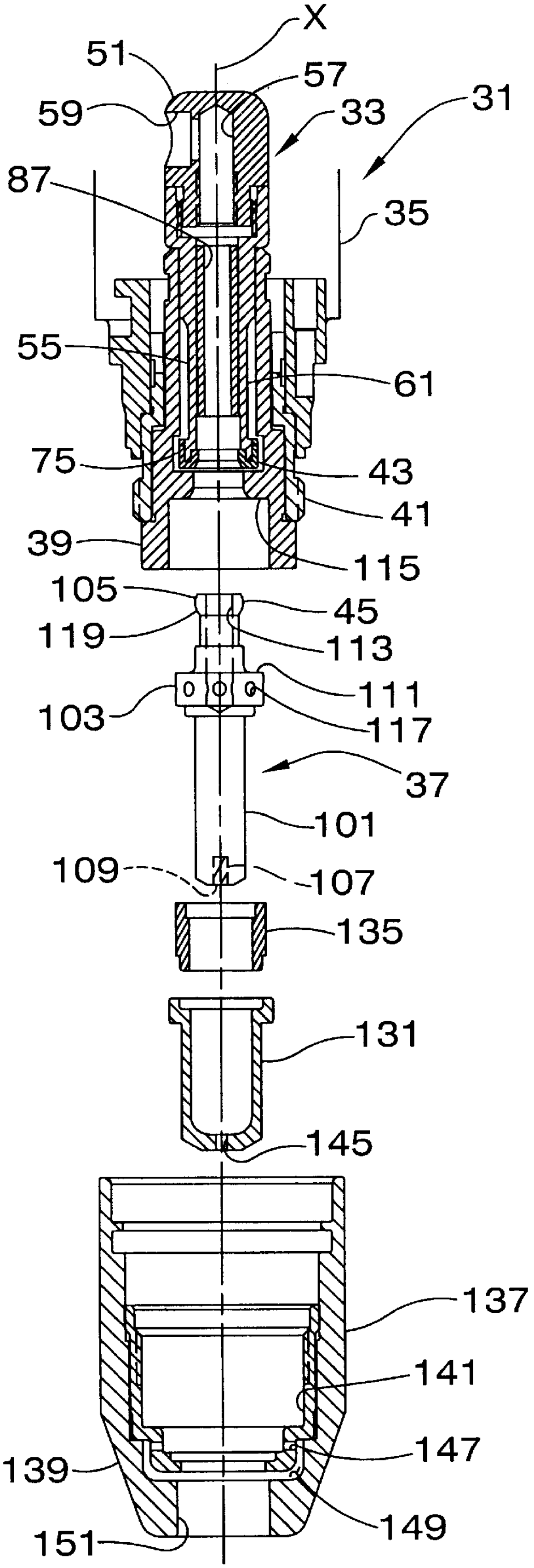
FIG. 2 is an exploded vertical section of the plasma torch head of FIG. 1.
Figure 3:
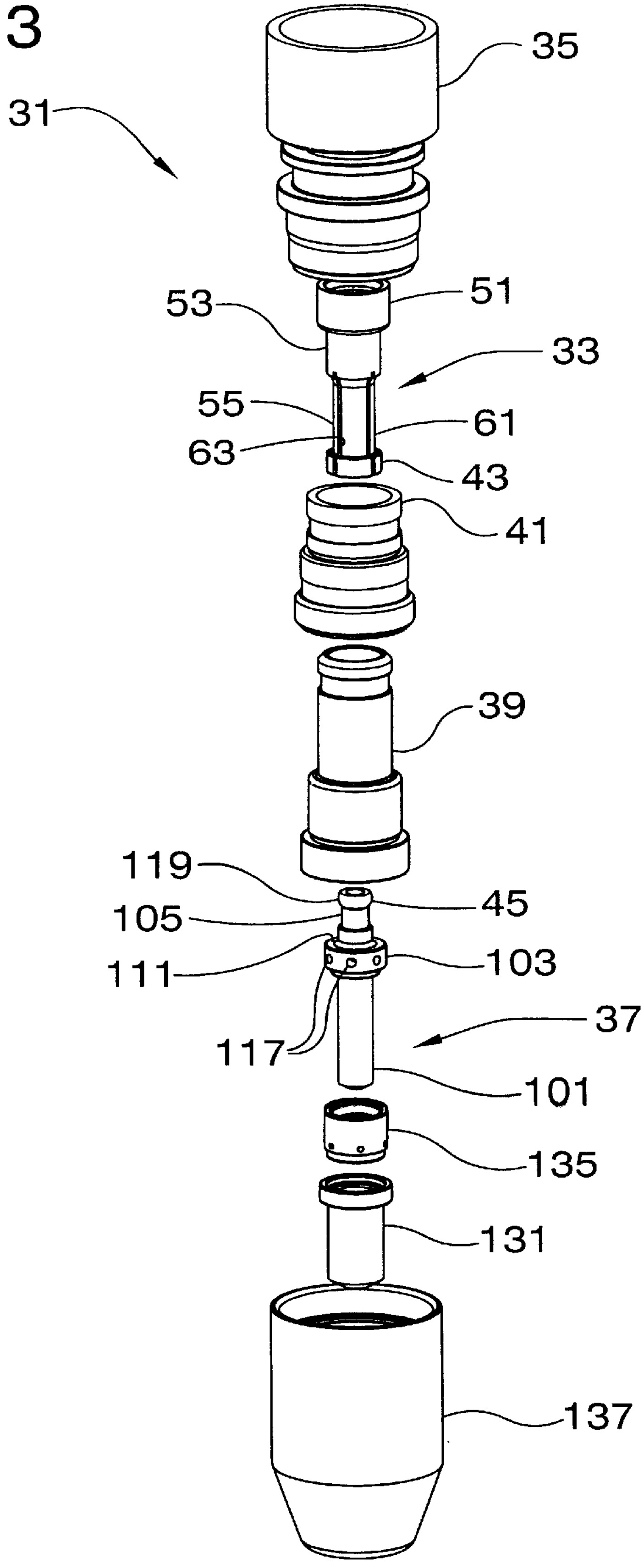
FIG. 3 is an exploded perspective of the plasma torch head of FIG. 1.
Figure 4:
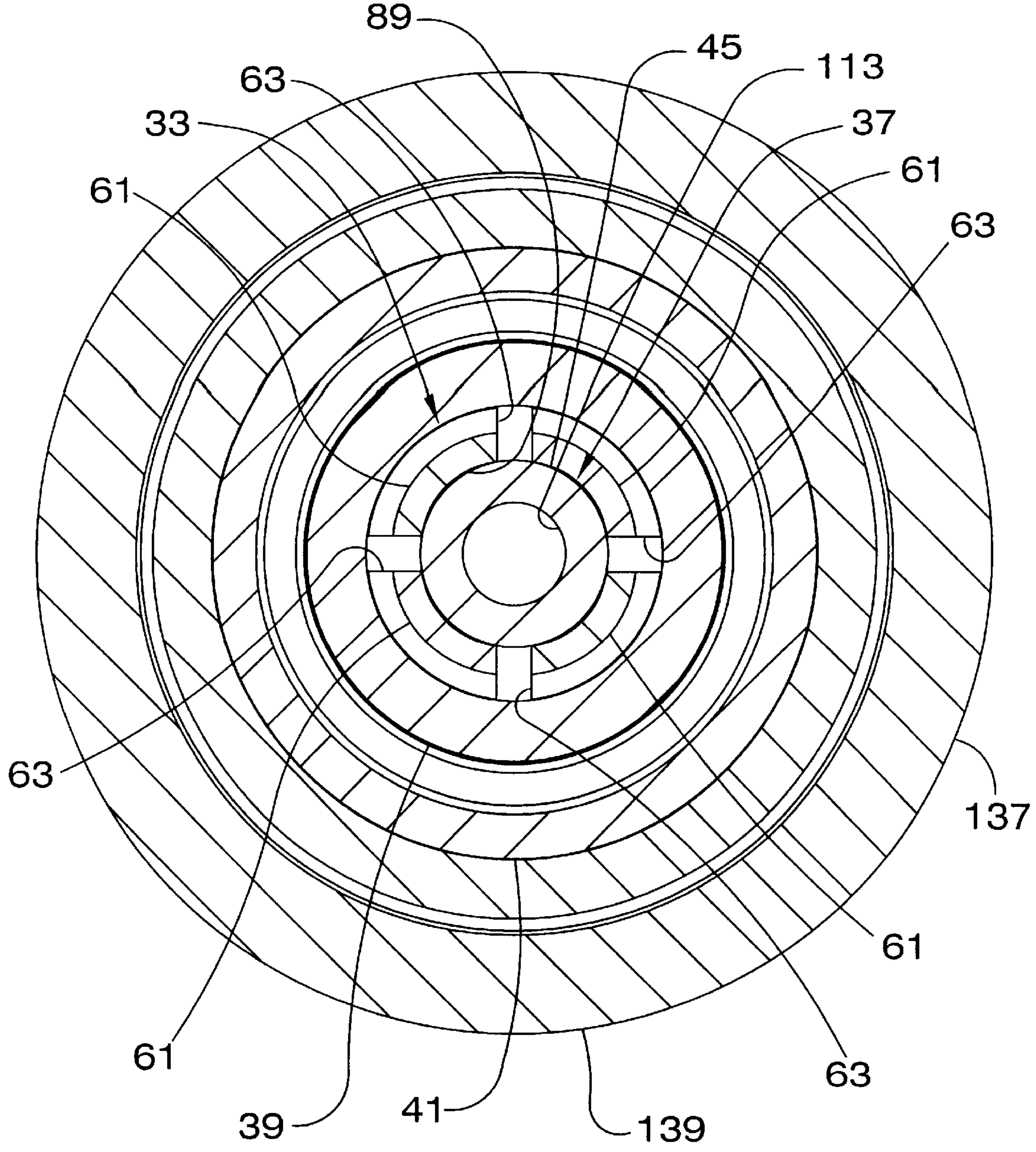
FIG. 4 is a section taken in the plane of line 4—4 of FIG. 1.

Referring to FIGS. 1 and 3, the connecting end 55 of the cathode 33 comprises a set of resilient longitudinally extending prongs 61 defined by vertical slots 63 in the cathode extending up from the bottom of the cathode. The prongs 61 have upper ends 65 integrally connected to the body 53 of the cathode 33 and free lower ends 67 which are offset radially outwardly so that each prong has an upper radial shoulder 69 and a lower radial shoulder 71. The prongs 61 are sufficiently resilient to permit generally radial movement of the prongs between a normal, undeflected state (FIGS. 2 and 5) and a deflected state (FIG. 1) in which the prongs are deflected outward away from each other and the central longitudinal axis X of the torch to increase the inner diameter of the cathode connecting end 55 to enable the electrode 37 to be inserted up into the cathode, as will be described. The radial outward movement of the prongs 61 is permitted by an annular gap 73 formed between the connecting end 61 of the cathode 33 and the central insulator 39.

Figure 5:
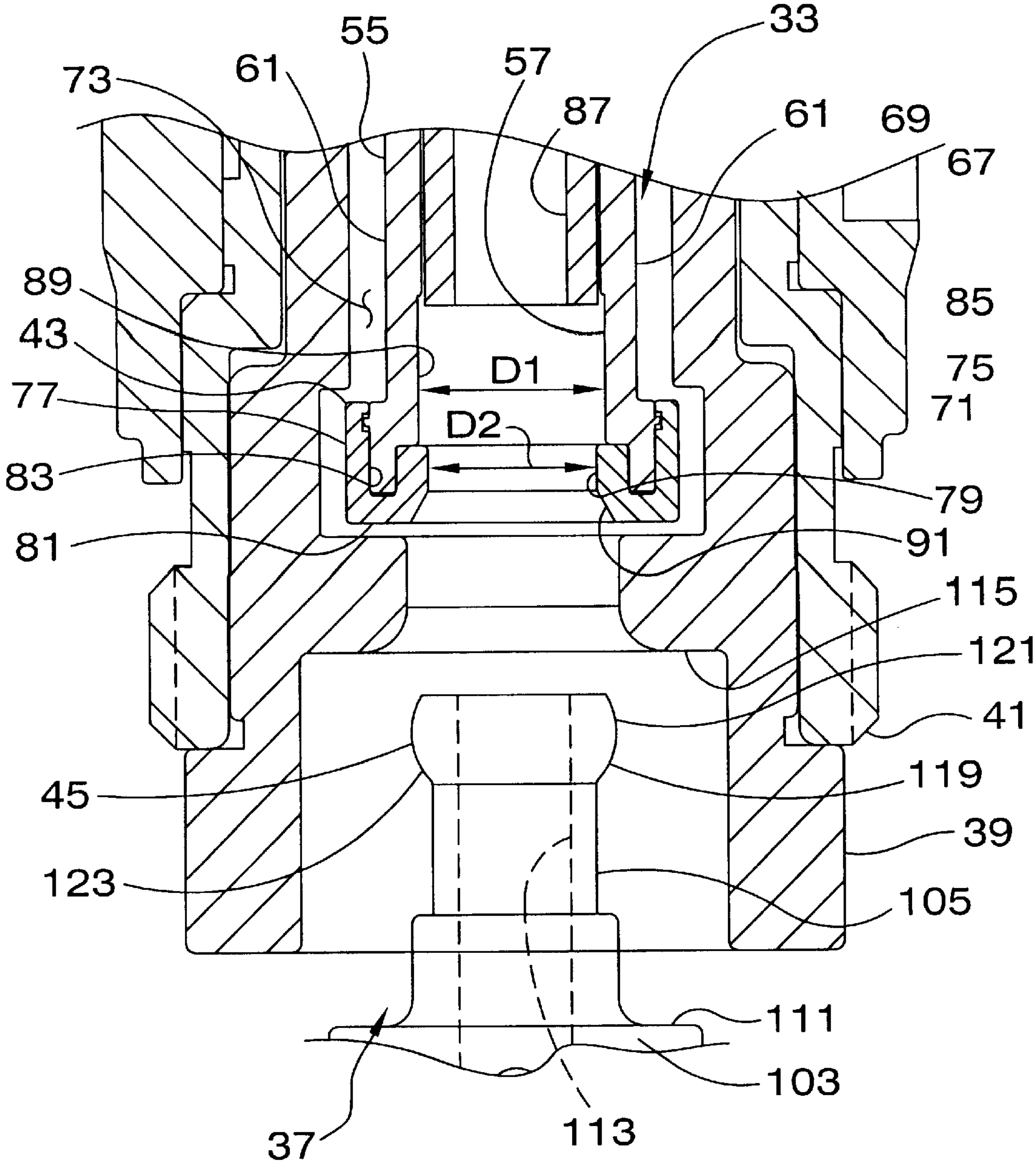
FIG. 5 is an expanded vertical section of a portion of the torch head of FIG. 1 showing respective connecting ends of the electrode and a cathode.

In the preferred embodiment, the detent 43 on the cathode 33 comprises a cap 75 of electrically insulating material fitted on the lower end 67 of each prong 61. Thus, it will be seen that the detent 43 is on the connecting end 61 of the cathode 33 for conjoint radial movement with the prongs between an undeflected and deflected state. As best illustrated in FIG. 5, the cap 75 is generally J-shaped in vertical section, comprising an outer wall 77, an inner wall 79 and a bottom wall 81 which define a recess 83 for receiving the offset lower end 67 of the prong 61. The outer wall 77 of the cap 75 and the lower end 67 the prong 61 have a tongue and groove connection for securely holding the cap on the prong. Significantly, the thickness of the inner wall 79 below the lower radial shoulder 71 of the prong 61 is greater than the width of the lower radial shoulder of the prong so that a portion of the inner wall projects radially inwardly beyond the lower shoulder to define a generally radial detent surface 85 of the cathode detent 43. A sleeve 87 of electrically insulating material is disposed on the inside of the cathode 33 at a location spaced above the radial detent surfaces 85, leaving a portion of the inside wall of the metal cathode exposed to function as an electrical contact surface 89 for the electrode 37. An inner edge 91 of the bottom of the cathode 33, e.g., of the insulating end caps 75, is tapered outward to provide a cam surface engageable by the electrode 37 upon insertion of the electrode into the cathode to initiate outward displacement of the prongs 61 to their deflected state. The amount of insertion force required to deflect the prongs 61 may vary, but approximately 5 lbs. of axially directed force has been found to be suitable.

The inner diameter D1 (FIG. 5) of the cathode 37 at the contact surface 89 is preferably about 0.208 inches; the inner diameter D2 of the cathode at the insulating end caps 75 is preferably about 0.188 inches; and each radial detent surface 85 preferably projects radially inward from the contact surface approximately 0.01 inches. However, it will be understood that these dimensions may vary. Also, in the preferred embodiment the connecting end 55 of the cathode 33 comprises four resilient prongs 61, but this number may vary from one prong to many prongs without departing from the scope of this invention. Moreover, the radial detent surfaces 85 may be formed in ways other than by the caps 75. For example, the caps 75 may be eliminated entirely, and the detent surfaces 85 may be formed by machined radial grooves or recesses (not shown) in the prongs 61, or by otherwise forming radially inwardly projecting surfaces (not shown) on the prongs.

Referring again to FIGS. 1 and 3, the electrode 37 is generally cylindric and has a solid lower end 101, an upper connecting end 105 adapted for coaxial telescoping connection with the lower connecting end 55 of the cathode 33 about the longitudinal axis X, and a gas distributing collar 103 intermediate the upper and lower ends of the electrode. The electrode 37 of the illustrated embodiment is constructed of copper, with an insert 107 of emissive material (e.g., hafnium) secured in a recess 109 in the bottom of the electrode in a conventional manner. The gas distributing collar 103 extends radially outward relative to the upper and lower ends 105, 101 of the electrode 37, defining a shoulder 111 between the gas distributing collar and the upper connecting end of the electrode. A central bore 113 of the electrode 37 extends longitudinally within the upper connecting end 105 generally from the top of the electrode down into radial alignment with the gas distributing collar 103. It is understood that the collar 103 may be other than gas distributing, such as by being solid, whereby the gas is distributed in another manner, without departing from the scope of this invention.

The central insulator 39 includes an annular seat 115 extending radially inward to define an inner diameter of the central insulator that is substantially less than the outer diameter of the gas distributing collar 103 such that the shoulder 111 formed by the gas distributing collar engages the annular seat 115 to limit insertion of the electrode 37 in the cathode 33 and axially position the electrode in the torch head 31. The top of the electrode 37 is open to provide fluid communication between the cathode central bore 57 and the electrode central bore 113 upon coaxial interconnection of the electrode and cathode 33. Openings 117 extend radially within the gas distributing collar 103 and communicate with the central bore 113 in the electrode connecting end 105 to exhaust working gas from the electrode 37.

With reference to FIG. 5, the outer diameter of the electrode connecting end 105 is predominately of a diameter less than the inner diameter D2 of the connecting end 55 of the cathode 33 at the insulating end caps 75 (e.g., at the cathode detent 43). However, the detent 45 on the electrode 37 comprises an annular protrusion 119 projecting generally radially outward from the connecting end 105 of the electrode such that the outer diameter of the electrode connecting end at the detent is substantially greater than the diameter of the inner surface of the cathode, including the cathode inner diameters D2 at the cathode detent 43 and D1 at the contact surface 89 above the cathode detent. For example, the electrode connecting end 105 of the illustrated embodiment preferably has an outer diameter of about 0.182 inches; and the outer diameter of the electrode connecting end at the electrode detent 45 is preferably about 0.228 inches.

The annular protrusion 119 constituting the electrode detent 45 is preferably rounded to provide an upper cam surface 121 engageable with the tapered inner edge 91 of the bottom of the cathode 33 to facilitate insertion of the electrode connecting end 105 into the cathode connecting end 55. The rounded protrusion 119 also includes a lower radial detent surface 123 engageable with the radial detent surfaces 85 of the cathode detent 43 to inhibit axial movement of the electrode connecting end 105 out of the cathode connecting end 55. It is contemplated that the electrode detent 45 may be other than annular, such as by being segmented, and may be other than rounded, such as by being squared or flanged, and remain within the scope of this invention as long as the detent has a radial detent surface engageable with the radial detent surfaces 85 of the cathode detent 43. It is also contemplated that the the detent may be formed separate from the electrode and attached or otherwise connected to the electrode, and may further be resilient, and remain within the scope of this invention. The axial position of the detent 45 on the connecting end 105 of the electrode 37 may also vary and remain within the scope of this invention, as long as the length of the electrode connecting end 105 is sufficient such that when the shoulder 111 of the gas distributing collar 103 engages the annular seat 115 of the central insulator 39, the electrode detent is disposed in the cathode 33 above the cathode detent 43 in electrical engagement with the contact surface 89 of the cathode.

As shown in FIGS. 1–3, a metal tip 131, also commonly referred to as a nozzle, is disposed in the torch head 31 surrounding a lower portion of the electrode 37 in spaced relationship therewith to define a gap forming a gas passage 133 between the tip and the electrode. The gas passage 133 is further defined by a tubular gas distributor 135 extending longitudinally between the tip 131 and the gas distributing collar 103 of the electrode 37 around the lower end of the electrode in radially spaced relationship therewith. The gas distributor 135 regulates the flow of working gas through the gas passage 133. The tip 131, electrode 37 and gas distributor 135 are secured in axially fixed position during operation of the torch by a shield cup 137 comprising an exterior housing 139 of heat insulating material, such as fiberglass, and a metal shield insert 141 secured to the interior surface of the housing. The exterior housing 139 has internal threads (not shown) for threadable engagement with corresponding external threads (not shown) on the torch body 35.

The lower end of the central insulator 39 is radially spaced from the gas distributor 135 and the electrode gas distributing collar 103 to direct gas flowing from the openings 117 in the collar into a chamber 143 defined by the central insulator, gas distributor, tip 131 and shield cup insert 141. The gas distributor 135 has at least one opening (not shown) in fluid communication with both the gas passage 133 and the chamber 143 to allow some of the gas in the chamber to flow into the gas passage and out of the torch through an exit orifice 145 in the tip for use in forming the plasma arc. The remaining gas in the chamber flows through an opening 147 in the shield cup insert 141 into a secondary passage 149 formed between the shield cup exterior housing 139 and metal insert for exit from the torch through an exhaust opening 151 in the shield cap. The shield cup 137, tip 131, gas distributor 135 and electrode 37 are commonly referred to as consumable parts of the torch because the useful life of these parts is typically substantially less than that of the torch itself and, as such, require periodic replacement. Operation of the plasma arc torch of the present invention to perform cutting and welding operations is well known and will not be further described in detail herein.

To assemble the plasma torch of the present invention, such as when the consumable electrode 37 requires replacement, the electrode of the present invention is inserted, upper connecting end 105 first, into the torch head 31 up through the central insulator 39. As the electrode connecting end 105 is pushed upward past the annular seat 115 of the central insulator, the cam surface 121 of the detent 45 on the electrode engages the tapered inner edges 91 of the insulating end caps 75 on the lower ends 67 of the prongs 6

1. The cam surface 121 of the electrode detent 45 urges the cathode prongs 61 outward to move the cathode detent 43 radially outward to its deflected state against the inward bias of the prongs, thereby increasing the inner diameter D2 of the cathode connecting end 55 at the cathode detent to permit further telescoping movement of the electrode connecting end 105 into the cathode to a position in which the radial detent surface 123 of the electrode detent 45 is above the radial detent surfaces 85 of the cathode detent 43.

Once the electrode detent 45 is pushed upward past the cathode detent 43, the electrode detent comes into radial alignment with the contact surface 89 of the cathode connecting end 55 above the detent surfaces 85 where the inner diameter D1 of the cathode connecting end is greater than the inner diameter D2 at the cathode detent. The cathode prongs 61, being in their deflected state, create inward biasing forces that urge the prongs to spring or snap inward to move the cathode detent 43 toward its undeflected state. The metal contact surface 89 of the cathode connecting end 55 is urged against the electrode detent 45 to electrically connect the cathode 33 and electrode 37. Inward movement of the cathode detent 43 generally axially aligns (e.g., in generally overlapping or overhanging relationship) the detent surface 123 of the electrode connecting end 105 with the detent surfaces 85 of the cathode connecting end 55. In other words, the electrode radial detent surface 123 is aligned with the cathode radial detent surfaces 85 so that in the event the electrode 37 begins to slide axially outward from the cathode 33 during assembly or disassembly, the electrode radial detent surface 123 engages the radial detent surfaces 85 to inhibit the electrode from falling out of the torch head 31. Since the outer diameter D2 of the electrode connecting end 105 at the electrode detent 43 is greater than the inner diameter of the cathode connecting end 55 at the contact surface 89, the cathode prongs 61 remain in a deflected state after interconnection of the electrode 37 and cathode 33 to maintain the biasing forces urging the prongs inward against the electrode detent 45 for promoting good electrical contact between the cathode and electrode.

To complete the assembly, the gas distributor 135 is placed on the electrode 37, the tip 131 is placed over the electrode to seat on the gas distributor, and the shield cup 137 is placed over the tip and gas distributor and threadably secured to the torch body 35 to axially fix the consumable components in the torch head 31. Upon securing the shield cup 137 to the torch body 35, the shoulder 111 of the gas distributing collar 103 of the electrode 37 engages the annular seat 115 of the central insulator 39 to properly axially position the electrode in the torch head.

To disassemble the torch, the shield cup 137 is removed from the torch body 35 and the tip 131 and gas distributor 135 are slid out of the torch. The electrode 37 is disconnected from the cathode 37 by pulling axially outward on the lower end 101 of the electrode. The electrode detent surface 123 engages the detent surfaces 85 of the cathode detent 43 and, with sufficient axial pulling force, the electrode detent surface urges the cathode prongs 61 outward to move the cathode detent 43 further toward its deflected state to allow withdrawal of the electrode connecting end 105 from the connecting end 55 of the cathode 33. The rounded detent surface 123 of the annular protrusion 119 facilitates the outward movement of the prongs 61 upon engagement with the detent surfaces 85 of the cathode detent 43.

As illustrated in FIGS. 1–5 and described above, the plasma torch of the present invention incorporates an interconnecting cathode 33 and electrode 37 in which the electrode is inserted into the cathode. Alternatively, the electrode 37 may instead be sized and configured for surrounding the cathode 33, with the electrode detent 45 extending radially inward from the electrode connecting end 105 and the cathode detent 43 projecting radially outward from the cathode connecting end 55 such that the cathode prongs 61 are deflected inward upon relative telescoping movement of the cathode and electrode.

FIGS. 6–9 illustrate a second embodiment of a plasma torch of the present invention in which an electrode 237 (as opposed to the cathode 33 of the first embodiment) has a connecting end 305 comprising resilient longitudinally extending prongs 361. As with the first embodiment described above, the torch of this second embodiment includes a cathode, generally indicated at 233, the electrode 237, a central insulator 239, a gas distributor 335, a tip 331 and a shield cup 337. The electrode 237 is configured for coaxial telescoping insertion into the cathode 233 on a longitudinal axis X of the torch for electrical connection with cathode.

In this second embodiment, the central insulator 239 and electrode 237 are formed with radially opposed detents, generally designated 243 and 245, respectively. These detents 243, 245 are interengageable with one another when the electrode 237 is inserted in the torch head 231 to inhibit axial movement of the electrode relative to the central insulator outward from the torch.

Figure 6:
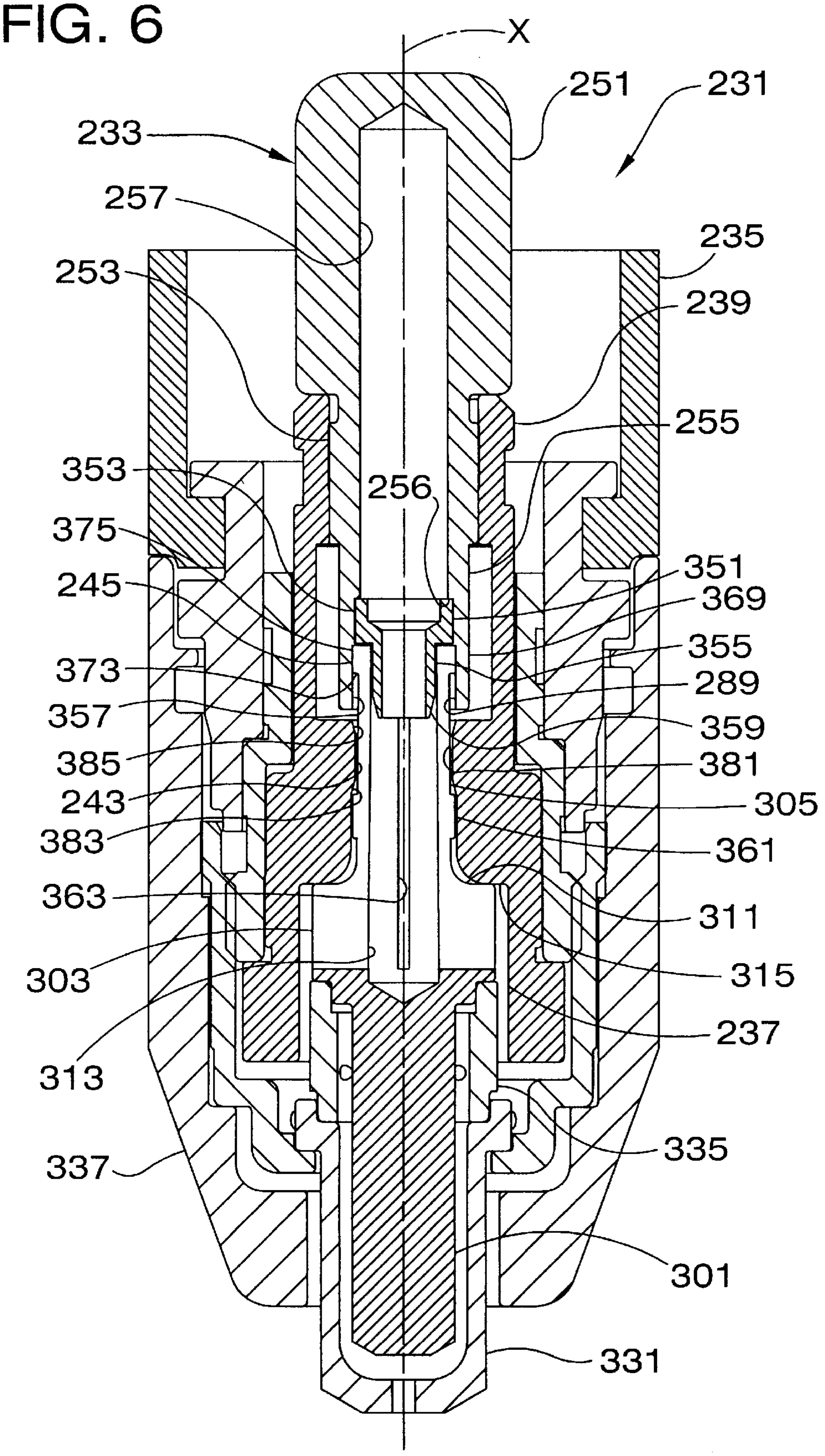
FIG. 6 is a vertical section of a torch head of plasma torch of a second embodiment of the present invention.

As shown in FIG. 6, the cathode 233 is substantially similar to the cathode 33 of the first embodiment, comprising a head 251, a body 253 and a lower connecting end 255. A central bore 257 extends longitudinally substantially the entire length of the cathode 233 to direct a working gas through the cathode. The connecting end 255 of the cathode 233 is generally of rigid construction and is formed of brass, free of the electrically insulating sleeve 87 and end caps 75 described above in connection with the first embodiment. The diameter of the inner surface of the cathode connecting end 255 is jogged outward to define a shoulder 256 (FIG. 9) for seating a plug 351 in the connecting end. The plug 351 is generally cylindric and has a head 353 sized for seating in the connecting end 255 of the cathode 233 up against the shoulder 256 in frictional engagement with the inner surface of the cathode connecting end to secure the plug in the cathode. A body 355 of the plug 351 extends down from the head and has a substantially smaller diameter than the head so that the outer surface of the body is spaced radially inward from the cathode connecting end 255. The inner surface of the connecting end 255 jogs further outward below the shoulder 256 and head 353 of the plug 351 and defines a contact surface 289 of the cathode connecting end for electrical contact with the electrode. The radial spacing between the contact surface 289 and the plug body 351 defines an annular gap or recess 357 sized for receiving the electrode connecting end 305 therein in electrical contact with the contact surface 289 of the cathode connecting end 255. A lower end 359 of the plug body 351 tapers inward to define a cam surface for urging the electrode connecting end 255 to seat in the recess 357 in electrical contact with the contact surface 289.

The electrode 237 of this second embodiment is generally cylindric and has a solid lower end 301, an upper connecting end 305 adapted for coaxial telescoping insertion in the cathode connecting end 255 and interconnection with the central insulator 239 about the longitudinal axis X, and a collar 303 intermediate the upper and lower ends of the electrode. The electrode 237 of the illustrated embodiment is constructed of copper, with an insert (not shown but similar to insert 107 of the first embodiment) of emissive material (e.g., hafnium) secured in a recess (not shown but similar to recess 109 of the first embodiment) in the bottom of the electrode in a conventional manner. The collar 303 extends radially outward relative to the upper and lower ends 305, 301 of the electrode 237, thus defining a shoulder 311 between the collar and the upper connecting end of the electrode. A central bore 313 extends longitudinally within the upper connecting end 305 of the electrode 237 generally from the top of the electrode down into radial alignment with the collar 303 of the electrode. The top of the electrode 237 is open to provide fluid communication between the cathode central bore 257 and the electrode central bore 313 upon insertion of the electrode 237 in the cathode 233.

Figure 7:
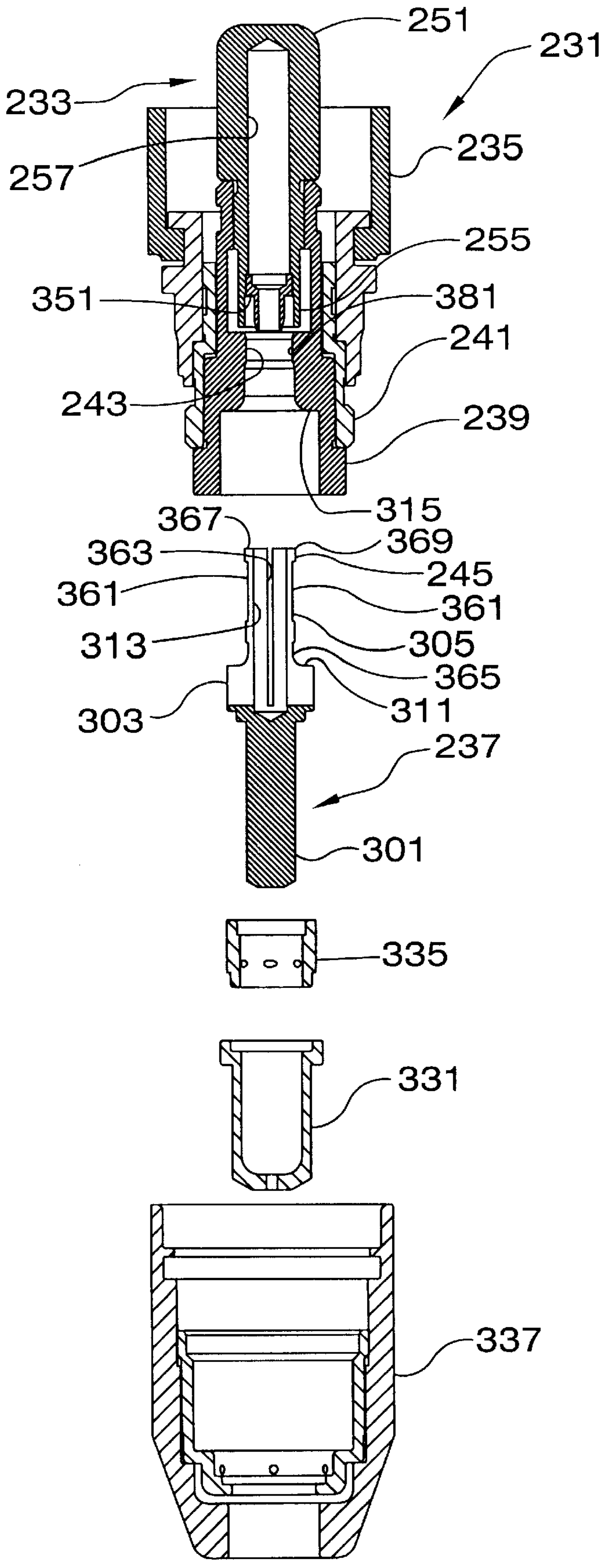
FIG. 7 is an exploded vertical section of the plasma torch head of FIG. 6.
Figure 8:
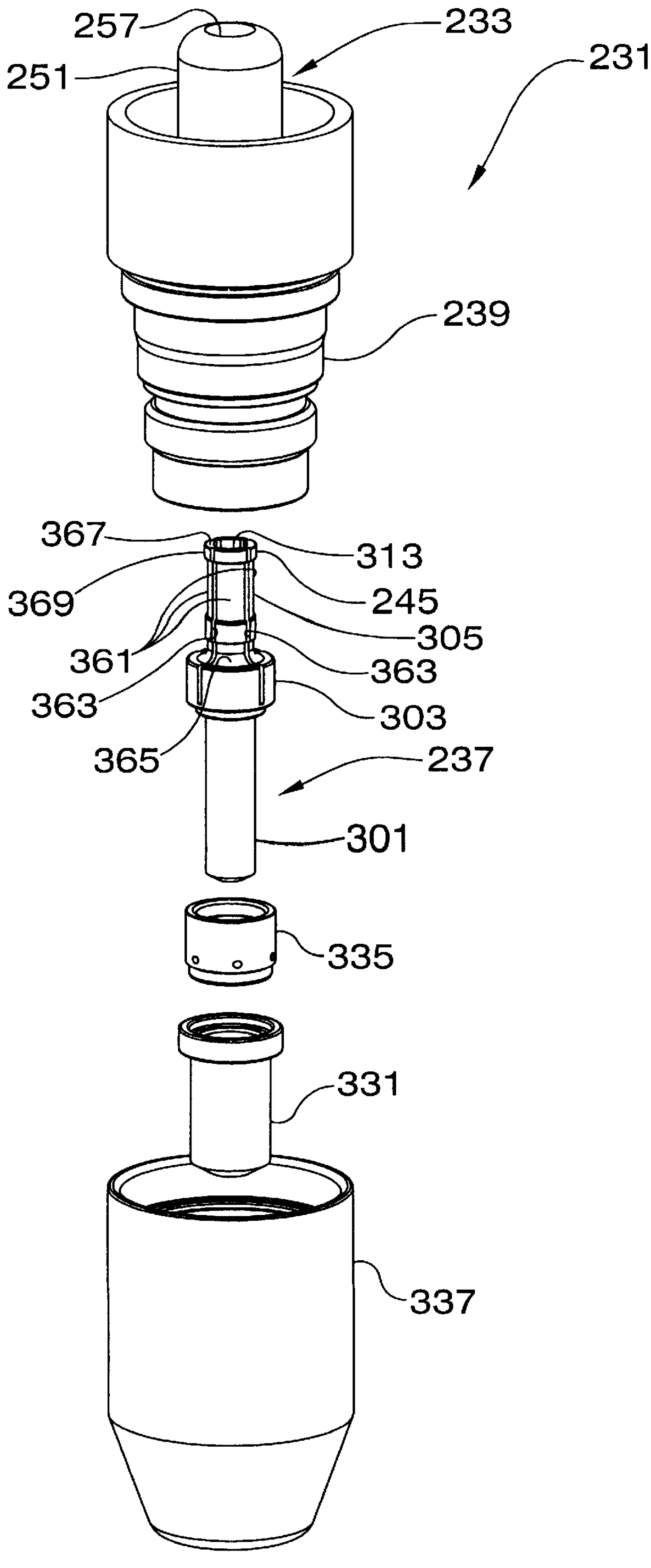
FIG. 8 is an exploded perspective of the plasma torch head of FIG. 6.

Referring to FIGS. 6 and 7, the upper connecting end 305 of the electrode 237 comprises a set of resilient longitudinally extending prongs 361 defined by vertical slots 363 in the electrode connecting end extending generally the length of the central bore 313 of the electrode. These vertical slots 363 also exhaust working gas from the electrode connecting end 305 in a manner substantially similar to the openings 117 of the gas distributing collar 103 of the first embodiment described above. The prongs 361 have lower ends 365, integrally connected to the collar 303 of the electrode 237, and free upper ends 367. The prongs 361 are sufficiently resilient to permit generally radial movement of the prongs between a normal, undeflected state and a deflected state in which the prongs are deflected inward toward each other and the central longitudinal axis X of the torch to decrease the diameter of the electrode connecting end 305 to enable insertion of the electrode connecting end up into the cathode connecting end 255, as will be described.

In the preferred embodiment, the electrode detent 245 comprises a radial projection 369 integrally formed with each prong 361 and extending radially outward from the free upper end 367 of each prong. Thus, it will be seen that the detent 245 is on the connecting end 305 of the electrode 237 for conjoint radial movement with the prongs 361 between an undeflected and deflected state. Each projection 369 is substantially square or rectangular in cross-section (FIG. 9) to define an upper surface 371, a lower radial detent surface 373 and an outer contact surface 375 for electrical contact with the contact surface 289 of the cathode connecting end 255. It is understood, however, that the shape of the detent 245 may vary without departing from the scope of this invention, as long as the detent has a lower radial detent surface 373 extending generally radially outward from the connecting, end 305 of the electrode 237 and the electrode is capable of electrical connection with the (cathode 239. Also, in the preferred embodiment the connecting end 305 of the electrode 237 comprises four resilient prongs 361, but this number may vary from one prong to many prongs without departing from the scope of this invention.

The central insulator 239 of this second embodiment includes an annular seat 315 extending radially inward to a diameter substantially less than the outer diameter of the electrode collar 303 such that the shoulder 311 formed by the collar engages the annular seat to limit insertion of the electrode 237 in the cathode 233 and axially position the electrode in the torch head 231. The detent 243 on the central insulator 239 is formed by an annular, radially inward extending protrusion 381 located between the bottom of the cathode 239 and the annular seat 315 of the central insulator. As shown in the illustrated embodiment, the detent 243 is preferably positioned adjacent the bottom of the cathode 233. At the lower end of the protrusion 381, the inner diameter of the central insulator tapers inward to define a cam surface 383 for initiating inward deflection of the electrode prongs 361 to their deflected state upon insertion of the electrode through the central insulator 239. The inner diameter of the central insulator 239 tapers back outward at the upper end of the detent 243 to define a radial detent surface 385 of the central insulator in generally radially and axially opposed relationship with the electrode detent surface 373. The tapered detent surface 385 of the central insulator detent 243 also provides a cam surface for deflecting the electrode prongs 361 inward to facilitate withdrawal of the electrode 237 from the cathode 233 upon disassembly of the torch. The detent surface 385 of the central insulator 239 preferably tapers outward to a diameter equal to or slightly less than the inner diameter of the contact surface 289 of the cathode connecting end 255 to guide insertion of the electrode connecting end 305 into the cathode connecting end when installing the electrode 237 in the torch.

Figure 9:
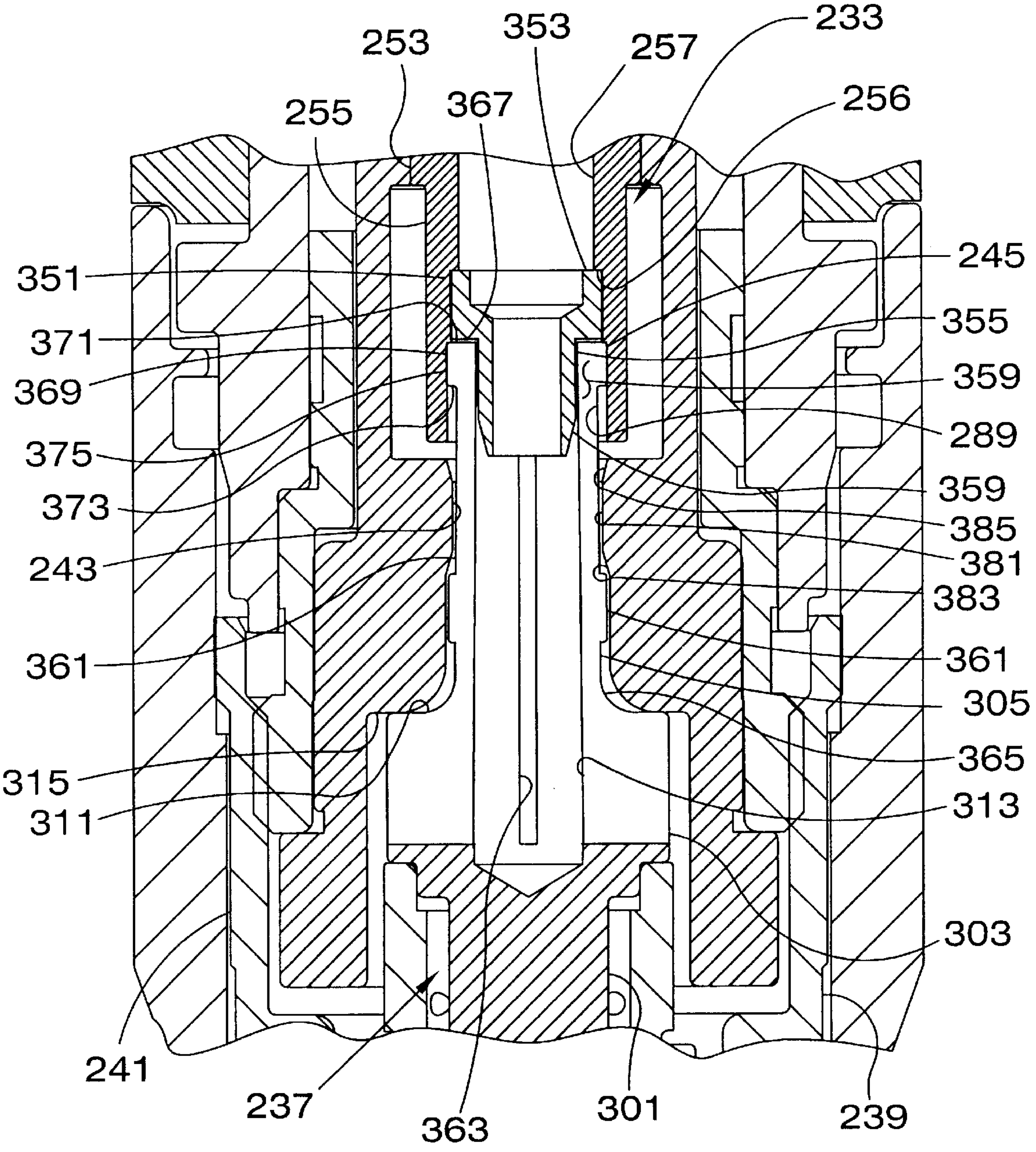
FIG. 9 is an expanded vertical section of a portion of the torch head of FIG. 6 showing respetictive connecting ends of the electrode and a cathode.

As seen best in FIG. 9, the electrode detent 245 is sized diametrically larger than the inner diameter of the contact surface 289 of the cathode connecting end 255 so that after insertion of the electrode 237 through the central insulator 239 and into the cathode connecting end, the prongs 261 and detent of the electrode will remain in an inward deflected state. The inward deflected prongs 361 create a biasing force that urges the prongs outward, thereby urging the electrode detent 245 to move radially outward into electrical engagement with the contact surface 289 of the cathode connecting end 255 to electrically connect the electrode 237 and cathode 233.

To assemble the plasma torch of the second embodiment, the electrode 237 is inserted, upper connecting end 305 first, into the torch head up through the central insulator 239. As the electrode connecting end 305 is pushed past the annular seat 315 of the central insulator 239, the upper surfaces 371 of the radial projections 369 on the prongs 361 of the electrode 237 engage the tapered lower cam surface 383 of the central insulator detent 243. The cam surface 383 urges the electrode prongs 361 inward against the outward bias of the prongs to radially move the electrode detent 245 inward to its deflected position, thereby decreasing the outer diameter of the electrode connecting end 305 at the electrode detent to permit further insertion of the electrode connecting end through the central insulator 239 and into the cathode connecting end 255 to a position in which the radial detent surfaces 373 of the electrode detent 245 are above the radial detent surface 385 of the central insulator detent 243.

Once the electrode detent 245 is pushed upward past the central insulator detent 243 and into the cathode connecting end 255, the electrode detent 243 comes into radial alignment with the contact surface 289 of the cathode connecting end 55 where the inner diameter of the cathode connecting end is greater than the inner diameter at the central insulator detent. The electrode prongs 361, being in their deflected state, create outward biasing forces that urge the prongs outward to move the electrode detent 243 toward its undeflected state. The outer contact surfaces 375 of the radial prong projections 369 are urged outward against the contact surface 289 of the cathode connecting end 289 to electrically connect the cathode 233 and electrode 237. Outward movement of the electrode detent 243 generally axially aligns (e.g., in overlapping or overhanging relationship) the detent surfaces 373 of the electrode connecting end 305 with the detent surface 385 of the central insulator 289. In other words, the electrode radial detent surfaces 373 are aligned with the central insulator detent surface 385 so that in the event the electrode 237 begins to slide axially outward from the torch head 231 during assembly or disassembly, the electrode radial detent surfaces 373 engage the radial detent surface 385 of the central insulator 239 to inhibit the electrode from falling out of the torch head 31.

Since the outer diameter of the electrode connecting end 305 at the detent 243 is greater than the inner diameter of the cathode connecting end 255 at the contact surface 289, the electrode prongs 361 remain in an inward deflected state after insertion of the electrode 237 in the cathode 233 to maintain the biasing forces urging the electrode detent 245 outward against the cathode contact surface for promoting good electrical contact between the cathode 233 and electrode. Where slight permanent inward deformation of an electrode prong 361 is present, the outward bias of the prong may not be sufficient to urge the electrode detent 245 into electrical contact with the cathode contact surface 289. In that case, the upper surface 371 of the radial projection 369 on the deformed prong 361 will engage the tapered lower end 359 of the plug body 355 upon insertion of the electrode connecting end 305 into the cathode connecting end 255. The tapered lower end 359 provides a cam surface that urges the electrode prong 361 outward, thereby moving the electrode detent radially outward to seat in the recess 357 between the plug body 355 and the contact surface 289 with the prong projections 369 in electrical engagement with the contact surface.

To complete the assembly, the gas distributor 235 is placed on the electrode 237, the tip 231 is placed over the electrode to seat on the gas distributor, and the shield cup 237 is placed over the tip and gas distributor and threadably secured to the torch body 235 to axially fix the consumable components in the torch head 231. Upon securing the shield cup 237 to the torch body 235, the shoulder 311 of the collar 303 of the electrode 237 engages the annular seat 315 of the central insulator 239 to properly axially position the electrode in the torch head.

To disassemble the torch, the shield cup 237 is removed from the torch body 235 and the tip 231 and gas distributor 235 are slid out of the torch. The electrode 237 is removed from the torch by pulling axially outward on the lower end 301 of the electrode. The electrode detent surfaces 373 engage the tapered detent surface 385 of the central insulator detent 243 and, with sufficient axial pulling force, the tapered detent surface urges the electrode prongs 361 further inward to move the electrode detent 245 further toward its deflected state to allow withdrawal of the electrode connecting end 305 from the central insulator 239.

As illustrated in this second embodiment, the plasma torch of the present invention incorporates an electrode 237 and central insulator 239 having interengageable detents 245, 243 for inhibiting axial movement of the electrode outward from the torch during assembly of the torch. However, it is understood that instead of the detent 243 extending radially from the central insulator 239, the detent may instead extend radially from the inner surface of the cathode connecting end 255 in a manner similar to that described above with respect to the first embodiment, without departing from the scope of this invention. Also, the electrode 237 may instead be sized and configured for surrounding the cathode 233, with the electrode detent 245 extending radially inward from the electrode connecting end 305 and a corresponding detent extending radially outward from the cathode connecting end 255 such that the electrode prongs 361 are deflected outward upon relative telescoping movement of the cathode and electrode.

It will be observed from the foregoing that the plasma torch of the present invention having an electrically connected cathode and electrode wherein the cathode 33 and electrode 37 are mechanically interconnected, or wherein the electrode 237 and another portion of the torch, such as the central insulator 239 in the second embodiment, are interconnected represents an improvement over conventional plasma torch designs. The opposed detents 43, 45 of the cathode and electrode connecting ends 55, 105, or detents 243, 245 of the central insulator 239 and electrode connecting end 305 of the second embodiment, are interengageable to positively inhibit the electrode from inadvertently falling out of, or being jarred loose from, the torch during assembly of the torch. Consequently, the risk of dropping and/or losing the electrode 37, 237 is consequently reduced. Moreover, providing the resilient prongs 61, 361 allows for quick telescoping connection and disconnection of the electrode 37, 237 from the cathode 33 or central insulator 239, making assembly of the torch less complicated and less time consuming. With respect to the first embodiment of FIGS. 1–5, providing the electrically insulating end caps 75 on the prongs 61, such that the end caps define the cathode detent 43, prevents the use of an electrode not having the connecting end 105 incorporating the electrode detent 45 of the present invention. For example, if the electrode connecting end 105 does not have a detent, only the insulating end cap 75 contacts the electrode connecting end upon insertion of the electrode 37 into the cathode 33, thereby precluding the necessary electrical contact between the cathode and electrode. Thus, the electrode detent 45 of the present invention is needed to electrically contact the contact surface 89 of the cathode 33 above the cathode detent 43.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A plasma torch comprising:

a cathode and electrode having connecting ends configured for a coaxial telescoping connection with one another on a central longitudinal axis of the torch; and interengageable detents on the connecting ends of the cathode and electrode, at least one of the detents being movable in a generally radial direction relative to the central longitudinal axis of the torch between an undeflected state and a deflected state, said at least one detent being movable from said undeflected state to said deflected state when said cathode and electrode are telescoped one into the other, and being movable from said deflected state back toward said undeflected state when the cathode and electrode are further telescoped to a point where the detents on the cathode and electrode are generally axially aligned whereby the at least one detent is engageable with the other detent to interconnect the cathode and electrode and inhibit axial movement of the electrode away from the cathode.

2. A plasma torch comprising:

a cathode and electrode having connecting ends configured for a coaxial telescoping connection with one another on a central longitudinal axis of the torch; and interengageable detents on the connecting ends of the cathode and electrode, at least one of the detents being movable in a generally radial direction relative to the central longitudinal axis of the torch between an undeflected state and a deflected state, said at least one detent being movable from said undeflected state to said deflected state when said cathode and electrode are telescoped one into the other, and being movable from said deflected state back toward said undeflected state when the cathode and electrode are further telescoped to a point where the detents on the cathode and electrode are generally axially aligned whereby the at least one detent is engageable with the other detent to interconnect the cathode and electrode and inhibit axial movement of the electrode away from the cathode;

the connecting end of one of said cathode and electrode comprising at least one resilient prong defined by at least one longitudinal slot in said connecting end, said detent being on the prong and comprising a generally radial detent surface engageable with an opposing generally radial detent surface of the other detent.

3. A plasma torch as set forth in claim 2 wherein said cathode connecting end comprises said at least one prong.

4. A plasma torch as set forth in claim 3 wherein said at least one prong has an upper end integrally connected to the cathode and a free lower end, said detent comprising a cap of electrically insulating material mounted on the free lower end of the prong, the thickness of the cap being sufficient to extend radially from the free lower end of the prong to define the generally radial detent surface of the detent on the cathode connecting end.

5. A plasma torch as set forth in claim 3 wherein the cathode has a longitudinal bore in its connecting end for receiving said electrode connecting end therein, the detent surface of the detent on the cathode connecting end extending generally radially inward from the cathode connecting end and the detent surface of the detent on the electrode connecting end extending generally radially outward from the connecting end of the electrode, said detent surfaces facing in opposite axial directions and being engageable with one another when the electrode is telescoped into said cathode to said point to inhibit withdrawal of the electrode from the cathode.

6. A plasma torch as set forth in claim 5 wherein the at least one prong is deflected outward upon insertion of the electrode connecting end in the cathode connecting end to move the detent on the cathode connecting end to its deflected state, the deflection of said at least one prong creating a biasing force that urges the at least one prong inward such that the cathode connecting end is urged into contact with the detent on the electrode connecting end to electrically connect the cathode and electrode.

7. A plasma torch as set forth in claim 5 wherein the detent on the cathode connecting end has a cam surface for facilitating movement of said at least one resilient prong to move the detent to its deflected state upon engagement of the cam surface by the detent on the electrode during insertion of the electrode connecting end in the cathode connecting end.

8. A plasma torch as set forth in claim 5 wherein the electrode detent comprises an annular protrusion having a detent surface extending generally radially outward from the electrode connecting end.

9. A plasma torch as set forth in claim 8 wherein the annular protrusion is rounded to define at least one cam surface for urging the at least one resilient prong of the cathode outward to move the detent on the cathode connecting end to its deflected state upon engagement of the cam surface with the detent of the at least one prong of the cathode to facilitate insertion or removal of the electrode connecting end into or out of the cathode connecting end.

10. A plasma torch cathode having a connecting end adapted for electrical connection with an electrode in the torch and a detent extending radially from the connecting end for interconnecting the electrode and cathode in the torch, the detent being movable in a generally radial direction relative to a central longitudinal axis of the cathode between an undeflected state and a deflected state for allowing relative telescopic movement of the cathode and electrode to interconnect the cathode and the electrode, said detent being movable from said undeflected state to said deflected state when said cathode and electrode are telescoped one into the other, and being movable from said deflected state back toward said undeflected state when the cathode and electrode are further telescoped thereby to interconnect the cathode and electrode, said detent inhibiting axial movement of the electrode out of the torch upon interconnection of the cathode and electrode.

11. A plasma torch cathode having a connecting end adapted for electrical connection with an electrode in the torch and a detent extending radially from the connecting end for interconnecting the electrode and cathode in the torch, the detent being movable in a generally radial direction relative to a central longitudinal axis of the cathode between an undeflected state and a deflected state for allowing relative telescopic movement of the cathode and electrode to interconnect the cathode and the electrode, said detent inhibiting axial movement of the electrode out of the torch upon interconnection of the cathode and electrode;

the connecting end of the cathode comprising at least one resilient prong defined by at least one slot extending longitudinally in the connecting end of the cathode, the detent having a detent surface extending generally radially from said at least one prong.

12. A plasma torch cathode as set forth in claim 11 wherein the detent extends generally radially inward from said at least one prong.

13. A plasma torch cathode as set forth in claim 11 wherein said at least one prong has an upper end integrally connected to the cathode and a free lower end, said detent comprising a cap of electrically insulating material mounted on the free lower end of the prong, the cap extending radially from the free lower end of the prong to define the radial detent surface.

14. A plasma torch electrode having a connecting end adapted for interconnection with the plasma torch, said connecting end being resiliently movable relative to a central longitudinal axis of the electrode between a normal, undeflected state and a deflected state in which the diameter of the connecting end of the electrode is substantially changed from its normal, undeflected state, said radial movement permitting insertion in and interconnection with the torch.

15. A plasma torch electrode having a connecting end adapted for interconnection with the plasma torch, said connecting end being resiliently movable relative to a central longitudinal axis of the electrode between a normal, undeflected state and a deflected state in which the diameter of the connecting end of the electrode is substantially changed from its normal, undeflected state, said radial movement permitting insertion in and interconnection with the torch;

the connecting end having a detent extending radially therefrom for use in interconnecting the electrode with the torch and inhibiting axial movement outward from the torch upon interconnection of the electrode and the torch.

16. A plasma torch electrode as set forth in claim 15 wherein the detent extends radially outward from the connecting end of the electrode.

17. A plasma torch electrode having a connecting end and a detent on the connecting end extending generally radially therefrom for interconnection with a cathode of the plasma torch to inhibit axial movement of the electrode out of the torch.

18. A plasma torch electrode as set forth in claim 17 wherein the detent extends radially outward from the connecting end of the electrode.

19. A plasma torch electrode as set forth in claim 17 wherein the detent comprises an annular protrusion.

20. A plasma torch electrode as set forth in claim 17 wherein the detent is rounded to facilitate insertion and withdrawal of the electrode into and out of the torch.

21. A plasma torch comprising:

a cathode and electrode having connecting ends configured for coaxial telescoping movement relative to one another on a central longitudinal axis of the torch;

a detent on the connecting end of the electrode;

a corresponding detent in the plasma torch arranged for interengagement with the detent on the electrode connecting end upon insertion of the electrode in the torch;

the detent on the connecting end of the electrode being movable in a generally radial direction relative to the central longitudinal axis of the torch between an undeflected state and a deflected state for allowing insertion of the electrode in the torch to a position in which the detent on the electrode connecting end is axially aligned and interengageable with the detent in the plasma torch to inhibit axial movement of the electrode outward from the torch.

22. A plasma torch electrode having a connecting end adapted for interconnection with the plasma torch, said connecting end being resiliently movable relative to a central longitudinal axis of the electrode between a normal, undeflected state and a deflected state in which the diameter of the connecting end of the electrode is substantially changed from its normal, undeflecied state, said radial movement permitting insertion in and interconnection with the torch;

the connecting end of the electrode comprising at least one resilient prong defined by at least one slot extending longitudinally in the connecting end of the electrode.

23. A plasma torch comprising:

a cathode and electrode having connecting ends configured for coaxial telescoping movement relative to one another on a central longitudinal axis of the torch;

a detent on the connecting end of the electrode;

a corresponding detent in the plasma torch arranged for interengagement with the detent on the electrode connecting end upon insertion of the electrode in the torch;

the detent on the connecting end of the electrode being movable in a generally radial direction relative to the central longitudinal axis of the torch between an undeflected state and a deflected state for allowing insertion of the electrode in the torch to a position in which the detent on the electrode connecting end is interengageable with the detent in the plasma torch to inhibit axial movement of the electrode outward from the torch; and a tubular central insulator having an upper portion surrounding the cathode on the central longitudinal axis of the torch and a lower portion for receiving the electrode connecting end therein, the detent of the torch being on the lower portion of the central insulator.

* * * * *